US007281120B2

(12) United States Patent
Dieffenderfer et al.

(10) Patent No.: US 7,281,120 B2
(45) Date of Patent: Oct. 9, 2007

(54) APPARATUS AND METHOD FOR DECREASING THE LATENCY BETWEEN AN INSTRUCTION CACHE AND A PIPELINE PROCESSOR

(75) Inventors: James N. Dieffenderfer, Apex, NC (US); Richard W. Doing, Raleigh, NC (US); Brian M. Stempel, Raleigh, NC (US); Steven R. Testa, Durham, NC (US); Kenichi Tsuchiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/810,235

(22) Filed: Mar. 26, 2004

(65) Prior Publication Data

US 2005/0216703 A1   Sep. 29, 2005

(51) Int. Cl.
*G06F 9/30* (2006.01)
(52) U.S. Cl. ...................... 712/219; 712/235
(58) Field of Classification Search ................ 712/219, 712/234, 235
See application file for complete search history.

(56) References Cited

U.S. PATENT DOCUMENTS

| | | | |
|---|---|---|---|
| 5,165,025 A | | 11/1992 | Lass |
| 5,717,946 A | * | 2/1998 | Satou et al. ................ 712/225 |
| 5,878,252 A | * | 3/1999 | Lynch et al. ................ 712/225 |
| 5,878,254 A | | 3/1999 | Shimada et al. |
| 5,954,815 A | * | 9/1999 | Joshi et al. ................ 712/237 |
| 5,958,047 A | | 9/1999 | Panwar et al. |
| 6,016,532 A | * | 1/2000 | Lynch et al. ................ 711/118 |
| 6,065,115 A | | 5/2000 | Sharangpani et al. |
| 6,112,289 A | * | 8/2000 | Matsuo ........................ 712/23 |
| 6,178,492 B1 | * | 1/2001 | Matsuo ........................ 712/23 |
| 6,247,124 B1 | * | 6/2001 | Joshi et al. ................ 712/240 |
| 6,269,439 B1 | | 7/2001 | Hanaki |
| 6,381,678 B2 | | 4/2002 | Fu et al. |
| 6,523,110 B1 | | 2/2003 | Bright et al. |

OTHER PUBLICATIONS

Free On-Line Dictionary of Computing. FOLDOC. © 1997. www.foldoc.org search term: cache miss.*

* cited by examiner

*Primary Examiner*—Richard L. Ellis
*Assistant Examiner*—Aimee J Li
(74) *Attorney, Agent, or Firm*—Connolly Bove Lodge & Hutz LLP; Joscelyn G. Cockburn

(57) ABSTRACT

A method and apparatus for executing instructions in a pipeline processor. The method decreases the latency between an instruction cache and a pipeline processor when bubbles occur in the processing stream due to an execution of a branch correction, or when an interrupt changes the sequence of an instruction stream. The latency is reduced when a decode stage for detecting branch prediction and a related instruction queue location have invalid data representing a bubble in the processing stream. Instructions for execution are inserted in parallel into the decode stage and instruction queue, thereby reducing by one cycle time the length of the pipeline stage.

3 Claims, 5 Drawing Sheets

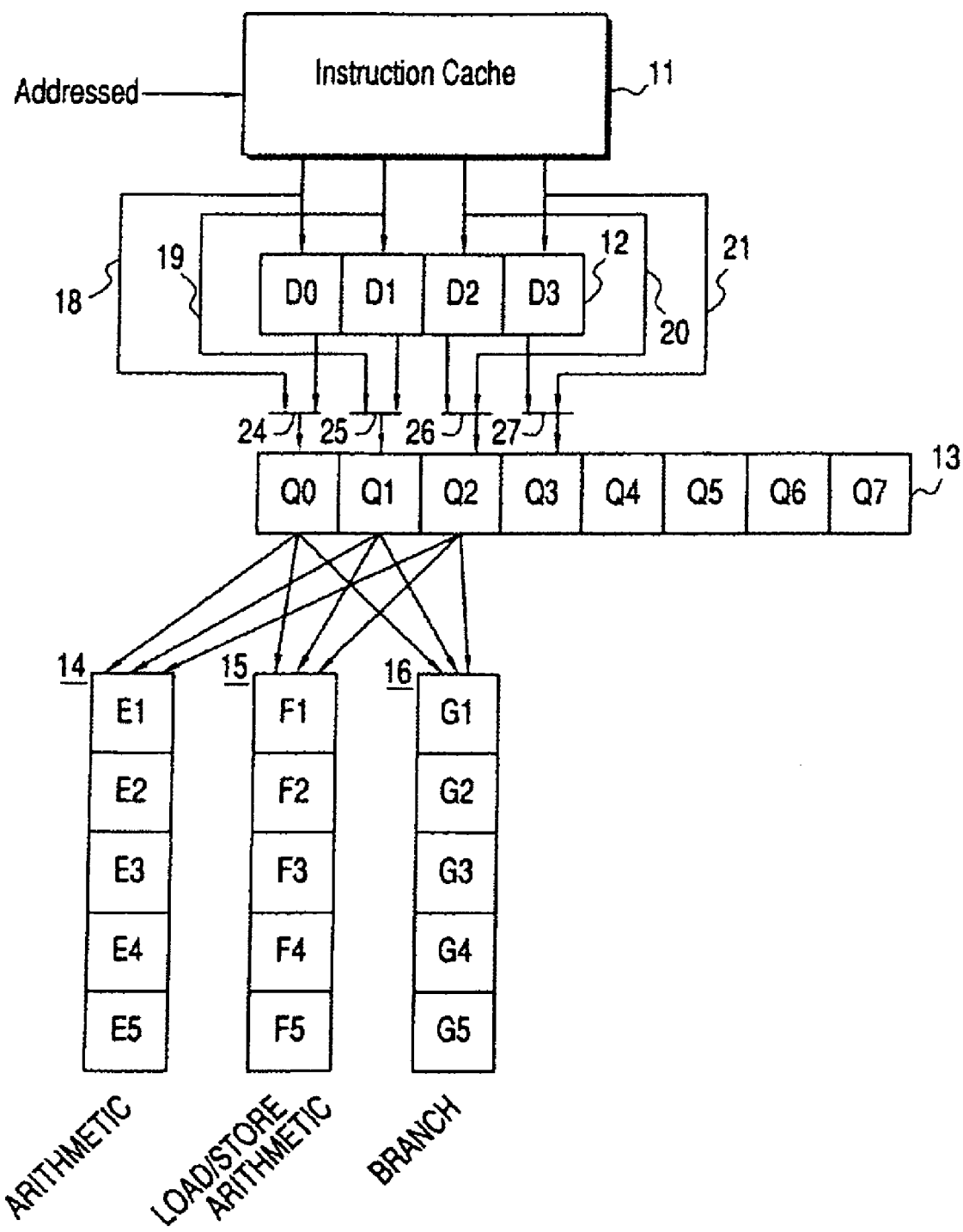

APPARATUS AND METHOD FOR DECREASING THE LATENCY BETWEEN AN INSTRUCTION CACHE AND A PIPELINE PROCESSOR

BACKGROUND OF THE INVENTION

The present invention relates to data processing systems. Specifically, the present application describes a method for improving pipeline processing to avoid execution delays due to changes in execution sequence.

Pipeline processing has been successfully employed in microprocessor design. Pipeline architecture breaks the execution of instructions into a number of pipelines for executing different types of instructions. Each stage of a pipeline corresponds to one step in the execution of an instruction making it possible to increase the speed of execution. Utilizing pipeline processing, multiple instructions can be broken down into individual stages which are executed in parallel during the same clock cycle. As opposed to serial processing, where all stages complete the processing of one instruction before beginning the processing of the next instruction, pipeline processor architecture overlaps the stages by processing different instructions at the same time. The effective processing speed of each instruction remains unchanged, but the throughput for instruction processing is increased because several instructions are being processed by different individual pipeline stages at the same time.

The beginning stages for the pipeline processing include retrieving instructions from an instruction cache and decoding the instruction in a stage where branch prediction is performed. If a branch is predicted to be taken in the execution of an instruction, all instructions following the branch are invalidated and a new execution sequence begins with the instructions of the predicted branch.

The number of stages in a pipeline increases the latency between the first access of an instruction, and its execution. During sequential execution of instructions, this additional latency is not a problem, as eventually most pipeline stages become occupied. However, there are interruptions in the execution sequence which may be produced as a result of an instruction which branches execution to another set of instructions or interruptions caused by context switching which require switching of the program completely. During the processing of instructions, attempts are made to predict branches which the execution will take. However, prediction errors occur, and when a misprediction is determined, the pipeline may have to be cleared of its contents, and the instructions identified by the branch executed in their place.

The result of a branch misprediction produces a latency between the first access of the correct instruction, and its execution. The latency can be reduced by improving on the branch prediction. However, there is always uncertainty in the prediction, and they are never perfect. When a misprediction occurs, the pipeline encounters a bubble and its contents must be flushed before the new execution sequence may begin.

As one technique for dealing with a mispredicted branch, the system may execute two possible paths of execution, and the correct path is selected once the final branch determination has taken place. This technique is hardware intensive and unrealistic where pipeline depths are approaching state of the art. A related solution saves fetched instructions behind a predicted branch in a buffer for quick access should a branch misprediction be detected. In a machine that uses three pipelines, this has a limited value since any buffered instructions would be located after and on the same cache lines as the branch itself.

Another branch related technique is to shift the determination of branches as far towards the top of the pipeline as possible to reduce the time between branch prediction and branch determination. This reduces the time in which speculative execution is taking place of instructions which may ultimately be discarded. Unfortunately this approach is difficult to implement in the state of the art processing where the clock frequencies are increased and therefore cycle times for each stage are decreased and the number of pipeline stages are increased.

The present invention provides for a latency reduction between stages of a pipeline processor in the face of a mispredicted branch where the execution sequence is changed to a new set of instructions, and the pipeline must be refilled. The same concept can be applied to context switching cases where a latency reduction can be obtained when a new set of instructions are refilled.

BRIEF SUMMARY OF THE INVENTION

A method and apparatus are provided for executing instructions in a pipeline processor having a reduced latency between the instructions cache and the instruction execution stages. The reduced latency is obtained by loading both the decode stage and the instruction queue simultaneously with the same instruction under certain favorable conditions.

In accordance with the invention, when a branch correction has occurred, such that there has been an instruction stream redirection in the execution sequence and the pipeline stages have been cleared, new instructions are accelerated into the queuing stage for issuing to the execution pipes by simultaneously loading the same instruction into two stages where they were previously loaded sequentially, since the pipeline stages are empty by default due to the instruction stream redirection. A plurality of multiplexers receive each of the instructions for loading in a decode stage and an instruction queue stage, and loading both stages occurs when it is determined that the instruction queue does not contain data.

The invention reduces the instruction issue latency on context switches which occur in the face of an interrupt. Following the instruction stream disruption, caused by the interrupt, a new stream of instructions are fetched and accelerated into both the decode and queue stages simultaneously for issuing to the execution pipes.

BRIEF DESCRIPTION OF THE DRAWINGS

FIG. 2 illustrates the loading of instructions in an instruction queue in accordance with the preferred embodiment of the invention.

DESCRIPTION OF THE PREFERRED EMBODIMENT

Figure 1A:
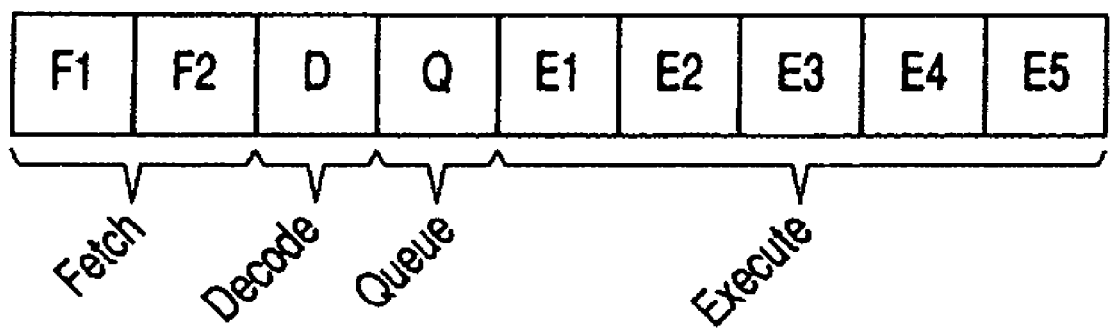
FIG. 1A illustrates the usual execution in one pipeline of a pipeline processor.

FIG. 1A shows a representative nine stage microprocessor pipeline. Execution begins when instructions F1 and F2 are addressed and fetched. The instructions F1 and F2 are fetched from an instruction cache and sequentially applied to what is shown as a decode stage D. The decode stage D is a branch prediction stage which detects branches and predicts whether a branch will be taken (and execution redirected to a new instruction stream) or not taken (sequential execution continues). In the event that the instruction stream has been redirected due to a predicted taken branch, the determination is made that the subsequent instructions are no longer valid. The new group of instructions are thereafter fetched based on the branch prediction determined by the branch instruction in D from the instruction cache.

Assuming however that the instruction is a valid instruction, and not a predicted taken branch, the instruction is loaded in an instruction queue Q. From there, instructions loaded in the instruction queue Q are pipelined through stages E1, E2, E3, E4 and E5.

In the event that the execution stage E2 has determined that an earlier branch prediction was wrong, or an interrupt has been invoked, the contents of the uncommitted pipeline F1, F2, D, Q, E1, E2, (E3), (E4), and (E5) are flushed. In a scenario in accordance with the present invention, the decode stage D and instruction queue Q are thereafter simultaneously loaded with the same fetched branch target or interrupt instructions from F2. The result is a reduction of the total pipeline length by one cycle. Thus, in the event there has been an interrupt and execution occurs in accordance with the instructions pertaining to the interrupt, or a branch misprediction has occurred and the correct set of instructions are being fetched, these stages will be initially empty. By loading an instruction in D and Q at the same time, which can only be possible when each of the stages are empty, a savings of one cycle execution is realized over the serial execution of FIG. 1A.

While the foregoing demonstrates that the two stages D and Q can be parallel loaded, it may also be possible to load other sequential pipeline stages if they are independent in their function.

Use of this technique results in a decrease in latency between access and execution of the first instruction following an interrupt or branch misprediction. For the example shown, a 25% reduction in latency could be obtained under ideal conditions. In the case of a branch mispredict latency, the execution cycles occurring following the branch instruction would be reduced approximately 15% from which the branch determination took place in E2. Obviously, if branches occur earlier in the execution sequence, such as E1, the impact is greater while if a branch determination occurs in E3, a reduced benefit is realized.

The more detailed explanation of the apparatus and method for effecting the foregoing reduction in the latency between access and execution of the first instruction following an interrupt or a branch mispredict is shown in FIG. 2. FIG. 2 describes an apparatus executing a method in accordance with a preferred embodiment of the invention which will reduce the pipeline latency when interrupts and mispredicted branches occur. The instruction cache 11 produces up to four instructions for execution in parallel. The addresses for the instructions are applied to the instruction cache under control of the pipeline processor so that the necessary instructions will be available for pipeline processing.

As shown in FIG. 2, there are three distinct pipeline processors, the arithmetic pipeline processor 14, a load/store or arithmetic processor 15, and a branch instruction pipeline processor pipeline 16. These particular pipelines execute the instruction which pertain to an arithmetic operation, a load/store or arithmetic operation, or a branch operation.

The normal path for instructions from the instruction cache 11 is through the decode stages 12, where up to four instructions may be received, and a prediction made as to whether they are to be subsequently executed. In the event that the decode stages 12 predict that an instruction is not to be executed due to a predicted taken branch, it is invalidated and does not reach the subsequent stages including the instruction queue 13. In the case of a normal pipelining, when the decoder determines that the instruction is valid, it passes the instruction from the decode stages through the multiplexers 24, 25, 26, 27 into a respective stage Q0-Q3 of the instruction queue 13 so that all stages of the pipeline are loaded with valid data.

Figure 1B:
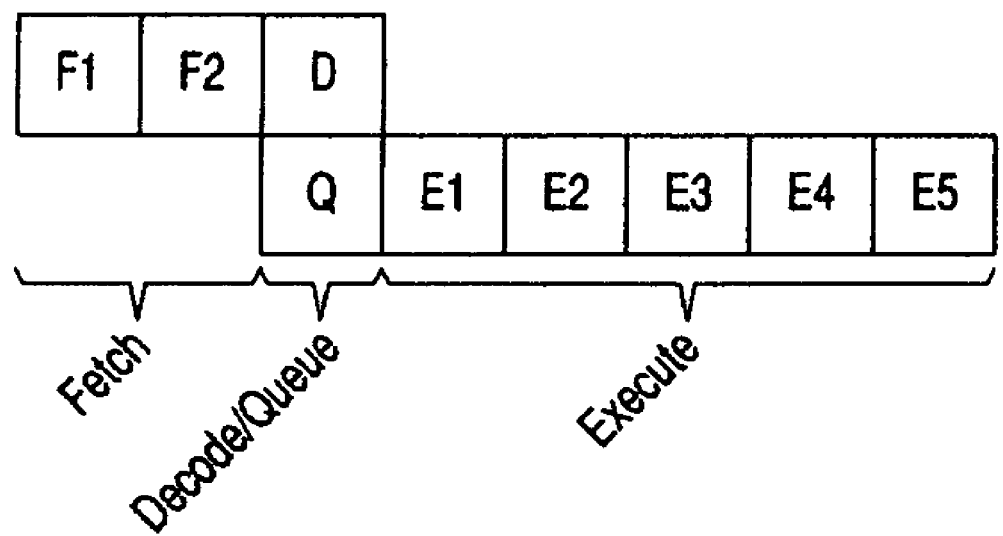
FIG. 1B shows the reduction in latency obtained with a preferred embodiment of the invention.

In accordance with the preferred embodiment of the invention, a parallel path is provided 18, 19, 20 and 21, so that instructions from the instruction cache 11 may be directly loaded into the instruction queue 13 following a mispredict correction, or an interrupt, which invalidates the contents of the instruction queue 13. In the event that the instruction queue 13 is empty due to such a branch misprediction or interrupt, one or more instructions from instruction cache 11 can be loaded through a respective multiplexers 24, 25, 26 and 27 to stages Q0-Q3 of the Queue 13, and the cycle saving represented in FIG. 1B is obtained.

Figure 3:
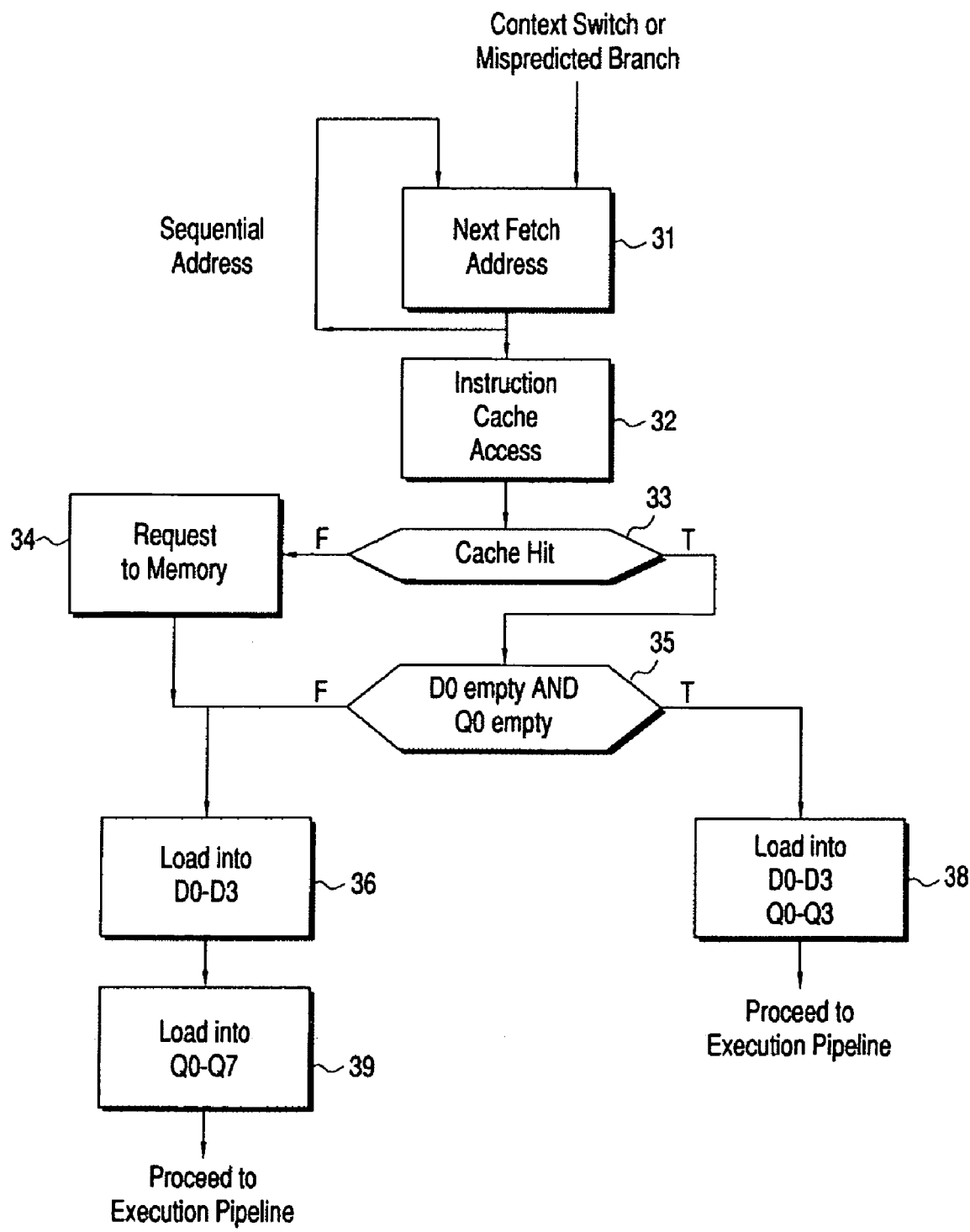
FIG. 3 is a flowchart showing how the present invention operates to reduce instruction latency.

The process for fetching and loading instructions in the instruction cache in accordance with the apparatus of FIG. 2 is shown in FIG. 3. Referring now to FIG. 3, the operation can be explained with respect to receipt of a context switch, due to an interrupt, or mispredicted branch being corrected in one of the pipelines 14, 15 and 16. Referring to FIG. 2, the mispredicted branch can occur in stage G2 of the pipeline and an interrupt can occur in any stage of the pipeline. In this case, a new instruction address will be supplied for fetching an instruction corresponding to the branch taken or interrupt path in step 31 from the processor. Alternatively, where no interrupts occur producing a context switch, no branches are predicted taken and instructions are sequentially fetched from the instruction cache in step 32.

In accordance with cache management principles, if a cache hit occurs in step 33 meaning that the requested instruction is available in the instruction cache, the instructions are fetched and processed from the instruction cache. Alternatively, if the cache does not contain the required instruction matching the fetch address in step 31, a request is made to external memory in step 34 to fetch the appropriate instructions from the memory unit.

A determination is made in step 35 whether a decode stage such as D and an instruction queue stage Q are empty (contain invalid data) in decision block 35. In the case both are empty, representing that instruction queue acceleration is available, the instructions may be loaded into both the decode stage D0-D3 and the instruction queue stages Q0-Q3 in step 38, thus reducing the number of pipeline cycles by one.

In the event that the next instruction must be requested from memory in step 34, or that the contents of the queue 13 are determined to be valid, i.e., containing a valid instruction, processing occurs as in conventional pipeline processing where instructions move from the decoder 12 to the instruction queue 13. In this stage, the instruction moves sequentially through decoder 12 in step 36 and into the queue 13 in step 39, assuming that decoder 12 has not invalidated the instruction due to a predicted taken branch.

Figure 4:
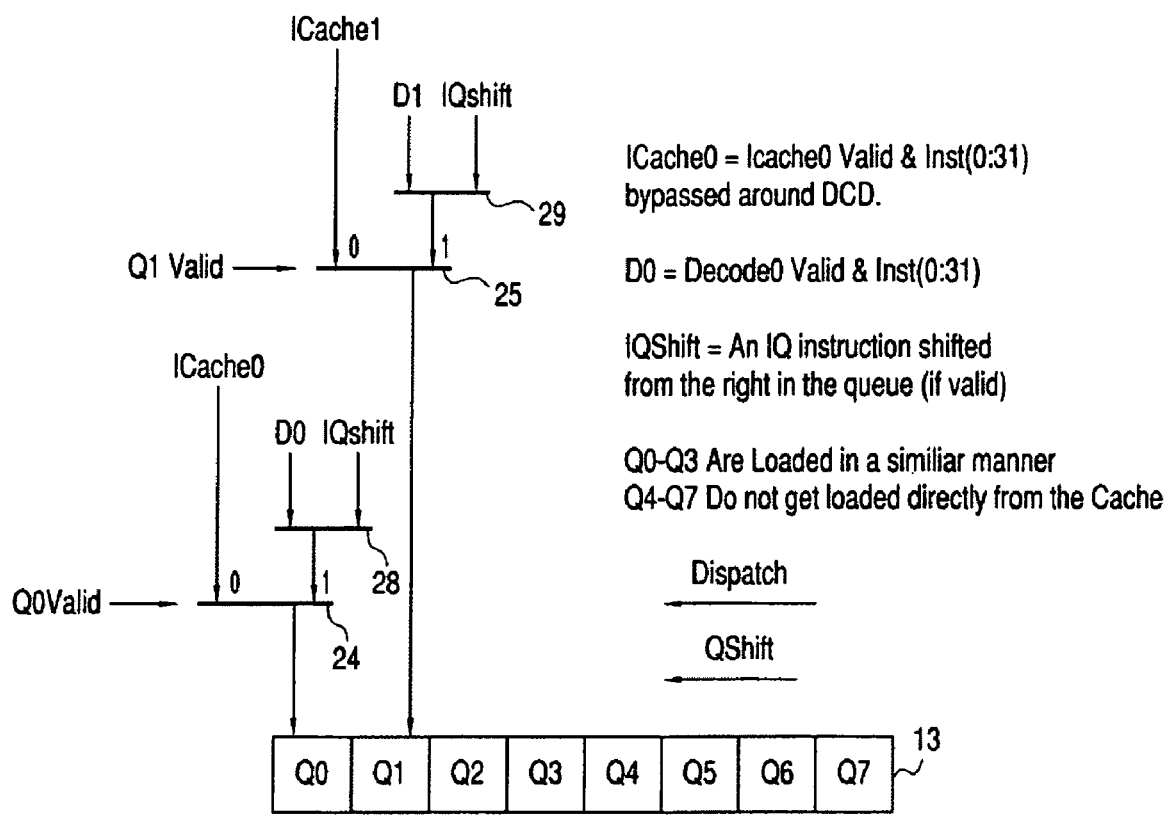
FIG. 4 illustrates the process and apparatus used for loading of the instruction queue.

The process of determining whether the instruction queue can be loaded in parallel with the decoder is illustrated more particularly with respect to FIG. 4. FIG. 4 illustrates the instruction queue 13 and the various ways it is loaded with instructions. Instructions are processed in batches of up to four instructions at a time. The instruction cache produces the four instructions which are decoded by the corresponding four decoding stages D0, D1, D2 and D3 of the decoder 12. Each of the instructions are loaded in the instruction queue 13 as space becomes available either in parallel with the loading of the decoder 12 or are merged into the queue, from the decoder 12, behind currently valid instructions.

The contents in the instruction queue are continuously shifted left as instructions are dispatched to the execution pipelines. Up to three instructions from locations Q0, Q1 and/or Q2 in the queue can be sent to the execution pipelines depending on the instruction types and pipeline availability. The locations are subsequently loaded by first shifting the contents left. Next, the empty queue 13 locations are loaded either from the decoder stages 12 or from the instruction cache 11 directly. Also shown are stages Q4-Q7 which are loaded with instructions from the decoder 12 as in the prior art. Each of stages Q0-Q7 holds in accordance with preferred embodiment 32 bits of instruction data and a valid bit. Normally, when any of the instruction queue 13 stages Q0-Q7 contain valid data, the queue may not be loaded in parallel with the decode stages but must be loaded in a conventional, sequential manner from decoder stage 12.

Multiplexers 24 and 25 are shown which effect the selection of instructions from the cache 11, for simultaneous loading in one of the instruction queue locations Q0-Q3, and the respective decoder 12 stage D0-D3. When the valid bit of data residing in the stages Q0, Q1, Q2, or Q3 shown in FIG. 4 are not valid, multiplexers 24 and 25 will load data from the instruction cache 11 directly into these locations. While not shown, it is understood that two other multiplexers are available to control the loading of instructions in Q2 and Q3. Thus, in one instruction cycle, up to four instructions can be loaded into instruction queue 13 before branch prediction has been performed. Once branch prediction has been performed, these instructions may be subsequently invalidated within the instruction queue 13 if they remain therein after having been determined as belonging to a branch which is not predicted to be executed.

When valid data is contained within either of stages Q0 and Q1, then data must enter from the decoder 12 or from IQ shift. The decoder 12 path of multiplexers 28 and 29 are used to move data from the decoder 12 to the queue 13 whenever there are invalid positions in the queue 13 available to be loaded. When instructions are valid in the queue such as Q2-Q3 then the IQ shift path of multiplexers 28 and 29 is used to load Q0 and Q1. Additionally, queue instructions can be dispatched to the execution stages and reloaded simultaneously from decode or from shifting the queue via IQ shift.

Instructions to the individual pipelines are processed depending on whether they are arithmetic, load/store, or branch instructions. Under control of the pipeline stages, the instructions to be executed are loaded from stages Q0-Q2. The contents of the instruction queue are shifted leftward, following each dispatch of instructions from stages Q0-Q2. Whether instructions are loaded in a parallel nature from the instruction cache to the instruction queue, or whether they pass first through the branch prediction decoder 12, they are ultimately validated. The parallel processing of instructions as noted previously reduces the total effective pipeline length and execution time for those circumstances where the instruction queue is found to be empty. In this way, traditional pipelining need not incur the delay in having instructions first processed through the decoder and then through the instruction queue.

Figure 5:
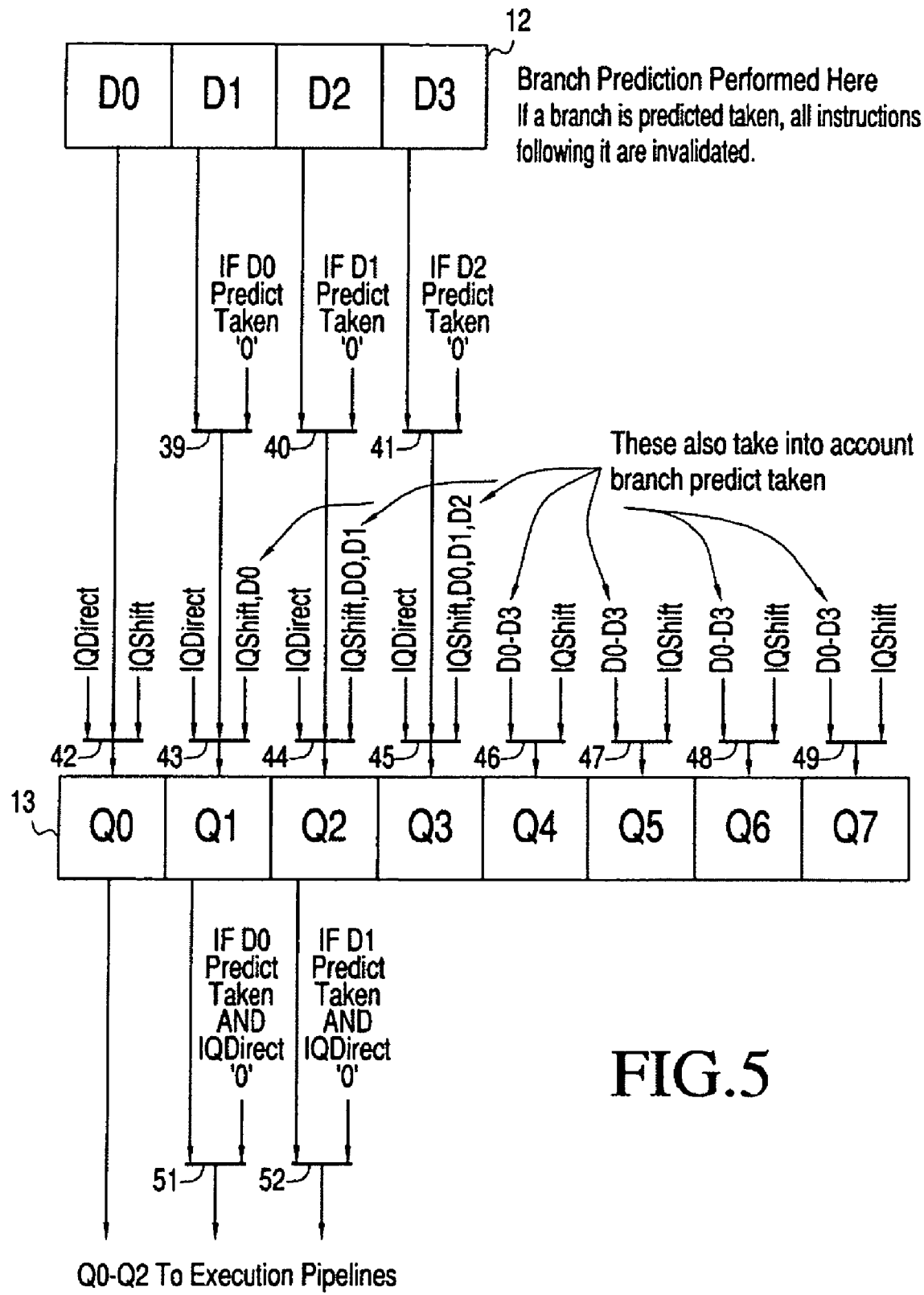
FIG. 5 illustrates how branch prediction is performed, and in the event of a misprediction, how instructions are invalidated.

Referring now to FIG. 5, the effect of a branch prediction on instructions loaded in the instruction queue 13 can be explained. As has been previously described, each of the locations Q0-Q3 of the instruction queue 13 may be loaded directly from the cache memory, or through the decoder stages 12. In the case where a direct load of the instruction is made from the cache memory to one of the locations Q0-Q3, the instruction following a branch instruction must be invalidated if the decoder 12 subsequently branch predicts that the directly loaded instruction is invalid because a branch has been predicted which does not include the loaded instruction. The instruction queue 13 has positions Q0-Q2 which are under the control of a dispatch command received from the pipelines, for dispatching upwards to three instructions at a time to the various execution pipelines. An empty position in the instruction queue 13 is filled with an instruction to the right of the empty location through the IQ shift command which shifts the contents left.

Multiplexers 39, 40 and 41 pass an instruction which has gone through a respective stage of the decoder 12 and has been validated, i.e., has not been determined to be part of a branch which has been predicted. When a instruction queue 13 stage is loaded from a decoder stage 12, multiplexers 39, 40 and 41 make sure that it is a valid instruction.

A second series of multiplexers 42-49 further controls the parallel and serial loading of instructions in the instruction queue 13. When Q0 is empty or contains invalid data, a location Q1-Q3 which has valid data is shifted left into Q0 by IQ shift applied to multiplexer 42 which shifts left the contents of the registers. Similarly, when Q1, Q2, Q3, Q4, Q5, Q6 or Q7 contains invalid data, the contents of a location to the right which contains valid data can be shifted left into one of the locations through multiplexers 43-49 by the IQ shift command. As shown in the figure, these locations can also be loaded serially from the decoder locations once they have been validated.

In the case of a direct load, from the cache represented by IQ direct, multiplexers 51 and 52 invalidate the instruction from being sent to the execution pipelines when a directly loaded instruction in Q1 or Q2 represents a path not taken because there has been a branch predicted. Multiplexer 51 will inhibit the passing of a directly loaded instruction in stage Q1 when instruction immediately beforehand, resulted in a branch prediction. Thus, directly loaded instructions in stage Q1 will pass through multiplexer 51 only when a branch has not been predicted in stage D0 of the decoder 12.

Similarly, multiplexer 52 prevents the instruction loaded in Q2 from being sent to the execution pipelines when the directly loaded instruction in Q2 follows an instruction which a branch was determined by D1 to be a branch which was taken. Multiplexers 51 and 52 permit instructions to be transferred from locations Q1 and Q2 which previously passed through stages D1 and D2, and are not the result of a direct load in the instruction queue 13. The figure illustrates various IQ shifts, which are there to continually shift leftward the contents of each of the stages of queue 13. Depending on how many locations have been dispatched out to the execution pipelines (in the current example, up to three instructions are dispatched at a time), 1, 2, or 3 positions may be reloaded depending on the number of valid instructions in the queue and the number of valid instructions in decode.

In the scenario represented by FIG. 5, the contents of Q0-Q3 have been loaded in parallel with the contents of D0-D3. Following loading in Q0-Q3 and D0-D3, if a branch prediction results, i.e., indicating that instructions fetched from the instruction cache following the branch instruction in the decoder stage D0 are therefore invalid, multiplexer 39 forces location Q1 of instruction queue 13 to be invalidated. Similarly, multiplexers 40 and 41 force Q2 and Q3 to be invalidated when the decoder of the instructions in D1 or D2 predict a taken branch instruction.

Thus, there has been described a system which permits direct loading to the instruction queue 13 when both the instruction queue 13 and the decoder stage 12 are empty. Using the direct load feature reduces the latency to the execution units, by reducing the requirement that it first be loaded to the decoder 12, before being loaded to the instruction queue 13.

The foregoing description of the invention illustrates and describes the present invention. Additionally, the disclosure shows and describes only the preferred embodiments of the invention in the context of a apparatus and method for decreasing the latency between instruction cache and a pipeline processor, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed as new and desired to be protected by Letters Patent of the United States is:

1. An apparatus for reducing the latency between stages of a pipelined processor, the apparatus comprising:
   an instruction cache producing a plurality of instructions for execution by said pipelined processor;
   a plurality of decode stages connected to receive the plurality of instructions from said cache;
   an instruction queue having a plurality of locations, wherein one of the plurality of locations is configured to receive an associated instruction and a valid bit; and
   a multiplexer associated with said one of the plurality of locations,
   wherein, depending on a value of the valid bit, said multiplexer supplies said one of the plurality of locations in the instruction queue with either an output of one of the decode stages or an output of the instruction cache,
   wherein, when the output of the instruction cache is supplied to said one of the plurality of locations in the instruction queue, the output of the instruction cache is simultaneously supplied to said one of the decode stages.

2. The apparatus according to claim 1, wherein said multiplexer receives a shift signal for said instruction queue which shifts contents of said instruction queue towards an output port of said instruction queue, and which enables said instructions from said decoder to be transferred to said instruction queue.

3. The apparatus according to claim 1, wherein said output port of said instruction queue is connected to a plurality of parallel processing stages.

* * * * *